United States Patent [19]

Shuey et al.

[11] Patent Number: 4,532,041

[45] Date of Patent: Jul. 30, 1985

[54] ASYMMETRIC POLYIMIDE REVERSE OSMOSIS MEMBRANE, METHOD FOR PREPARATION OF SAME AND USE THEREOF FOR ORGANIC LIQUID SEPARATIONS

[75] Inventors: Harry F. Shuey, San Dimas, Calif.; Wankei Wan, Sarnia, Canada

[73] Assignee: Exxon Research and Engineering Co., Florham Park, N.J.

[21] Appl. No.: 564,302

[22] Filed: Dec. 22, 1983

Related U.S. Application Data

[63] Continuation-in-part of Ser. No. 494,543, May 13, 1983, abandoned.

[51] Int. Cl.$^3$ .............................................. C08G 20/32
[52] U.S. Cl. .................. 210/500.2; 585/818; 585/819
[58] Field of Search ............. 210/500.2; 585/818, 585/819

[56] References Cited

U.S. PATENT DOCUMENTS

| | | | |
|---|---|---|---|
| Re. 30,351 | 7/1980 | Hoehn et al. | 55/16 |
| 2,947,687 | 8/1960 | Lee | 210/23 |
| 3,179,632 | 4/1965 | Hendrix | 260/78 |
| 3,179,633 | 4/1965 | Endrey et al. | 260/78 |
| 3,546,175 | 12/1970 | Angelo | 260/65 |
| 3,708,458 | 1/1973 | Alberine | 260/65 |
| 3,816,303 | 6/1974 | Wrasidlo | 210/23 |
| 3,822,202 | 7/1974 | Hoehn | 210/23 |
| 3,853,754 | 12/1974 | Gosser | 210/23 |
| 3,925,211 | 12/1975 | Schumann et al. | 210/500 |
| 4,071,590 | 1/1978 | Strathmann | 264/45.1 |
| 4,113,628 | 9/1978 | Alegranti | 210/500 |
| 4,240,914 | 12/1980 | Iwama et al. | 210/500 |
| 4,307,135 | 12/1981 | Fox | 427/244 |
| 4,378,324 | 3/1983 | Makino et al. | 264/41 |

FOREIGN PATENT DOCUMENTS

| | | |
|---|---|---|
| 301074.1 | 9/1981 | European Pat. Off. |
| 301480.0 | 10/1981 | European Pat. Off. |
| 3223075 | 1/1983 | Fed. Rep. of Germany |
| 3221545 | 1/1983 | Fed. Rep. of Germany |

(List continued on next page.)

OTHER PUBLICATIONS

"New Polyimide Ultrafiltration Membranes for Organic Use", Iwama et al., Journal of Membrane Science, 11 (1982), 297-309.

"High Temperature Ultrafiltration Membrane", NASA Contract No. NAS7-100, Sarbalouki, JPL Invention Report 30-4918/NPO 15431.

"The Use of Solubility Parameters for Solvent Selection in Asymmetric Membrane Formation", Klein & Smith, Lowdale & Podall Editors, Reverse Osmosis Membrane Research, Plenum, NY, pp. 61-64.

(List continued on next page.)

Primary Examiner—Maurice J. Welsh
Attorney, Agent, or Firm—Joseph J. Allocca

[57] ABSTRACT

Asymmetric polyimide reverse osmosis membranes of high flux and selectivity for organic liquid separations are described. These membranes are prepared from undegraded polyimide by dissolving from 14–30 wt. % of the undegraded polymer in a dual solvent system comprising a polymer pro-solvent/anti-solvent wherein the pro-solvent is DMF and the anti-solvent is dioxane, wherein the ratio of anti-solvent/pro-solvent ranges from about 10:1 or more-1:1, preferably about 8:1–1.5:1, most preferably about 7:1–3:1; the polymer-solvent mixture is spread into a thin film of the desired thickness and permitted to evaporate for a time just sufficient to permit formation of an asymmetric dense active layer, i.e., within the range 2–120 seconds, preferably 2–60 seconds, most preferably 2–20 seconds before being immersed in a gelation bath.

The membranes may be fabricated in the form of sheets, tubes, hollow fibers, etc.

Mixtures of organic liquids, and especially mixtures of dewaxing solvents such as ketones, aromatic hydrocarbons and mixtures thereof, halogenated hydrocarbons such as dichloromethane, dichloroethane and mixtures of such halogenated hydrocarbons with ketones or aromatic hydrocarbons or other polar dewaxing solvents and dewaxed oils, are separated after completion of dewaxing operations, using the asymmetric polyimide reverse osmosis membrane described above.

14 Claims, 1 Drawing Figure

FOREIGN PATENT DOCUMENTS

| | | |
|---|---|---|
| 3223844 | 1/1983 | Fed. Rep. of Germany . |
| 3225837 | 2/1983 | Fed. Rep. of Germany . |
| 3225618 | 2/1983 | Fed. Rep. of Germany . |
| 4152680 | 12/1979 | Japan . |
| 6070805 | 6/1981 | Japan . |
| 7090098 | 6/1982 | Japan . |
| 7170934 | 10/1982 | Japan . |
| 1434639 | 5/1976 | United Kingdom . |
| 2051664 | 1/1981 | United Kingdom . |
| 2073654 | 10/1981 | United Kingdom . |
| 2098994 | 12/1982 | United Kingdom . |
| 2101137 | 1/1983 | United Kingdom . |

OTHER PUBLICATIONS

"Asymmetric Polyimide Membranes for Filtration of Nonaqueous Solutions", Strathmann, Desalination 26 (1978), pp. 85–91.

"Development of Chlorine Resistant Membrane Asymmetric Polyimide Membrane and Porous Substrates", Final Report by Membrane Systems, Inc. to Office of Water Research & Technology, Sudak et al., Contract No. 14-34-0001-9515.

"Development of Chlorine Resistant Reverse Osmosis Membrane and Porous Membrane Support", Office of Water Research & Technology, May 1979, PB80-102973.

"Soluble Polyimides Derived from Phenylindane Diamine: A New Approach to Heat Resistant Protective Coatings", Bateman et al.

ASYMMETRIC POLYIMIDE REVERSE OSMOSIS MEMBRANE, METHOD FOR PREPARATION OF SAME AND USE THEREOF FOR ORGANIC LIQUID SEPARATIONS

CROSS-REFERENCE TO RELATED APPLICATION

This application is a continuation-in-part of copending application U.S. Ser. No. 494,543, filed May 13, 1983, now abandoned.

BRIEF DESCRIPTION OF THE INVENTION

Organic liquids are separated one from the other by the use of a high flux, high selectivity asymmetric polyimide membrane under pressure at least sufficient to overcome the osmotic pressure. The organic liquid separation is preferably the separation of dewaxing solvents from dewaxed oil. The high flux, high selectivity asymmetric polyimide reverse osmosis membrane for use in this process is prepared from polyimide copolymer which is in an undegraded form.

DETAILED DESCRIPTION OF THE INVENTION

The process of the present invention using the asymmetric polyimide reverse osmosis membrane is the permselective separation of organic solutions, preferably comprising a mixture of a hydrocarbon oil basestock and dewaxing solvents. The separation is conducted by contacting the hydrocarbon oil/dewaxing solvent mixture with the dense active layer of the asymmetric polyimide membrane under pressure and recovering the permeate constituting high purity dewaxing solvent.

The hydrocarbon oil basestock can be any waxy hydrocarbon oil which is typically dewaxed. Such hydrocarbon oil can be derived from any typical natural or synthetic source including tar sands oils and oils recovered from shale. These waxy hydrocarbon oil stocks are dewaxed via conventional solvent dewaxing techniques to produce a dewaxed hydrocarbon oil basestock suitable for use as lube oil basestock, specialty oils, transformer oils, white oils, diesel fuels, jet fuels, aviation turbine oils, in effect for use as the basestock for the production of any oil or fuel which must have a low wax content.

Solvent dewaxing takes many varied forms. For example, the waxy oil can be mixed with a quantity of warm solvent to form a mixture which is then cooled down to the wax filtration temperature (i.e., to a temperature low enough for wax crystals to form) by indirect heat exchange means.

Alternatively, the waxy oil can be directly contacted with volumes of cold dewaxing solvent, this addition of cold solvent constituting the method by which the temperature of the overall mixture is lowered to the wax filtration temperature.

A much improved variation of the above procedure is seen in U.S. Pat. No. 3,773,650 (hereby incorporated by reference). In that patent the waxy oil is directly contacted with incremental volumes of cold solvent under conditions of high agitation at multiple stages in a staged chilling column or tower to reduce the temperature of the overall oil/solvent mixture to a temperature low enough to precipitate at least a portion of the wax. Chilling down to the wax separation temperature may be conducted either entirely in the staged agitated chilling tower, or chilling may be completed in other more conventional manners. Typical dewaxing solvents include ketones having from 3-6 carbons, such as acetone, methyl ethyl ketone (MEK), methyl isobutyl ketone (MIBK); $C_6$-$C_9$ aromatic hydrocarbons such as toluene, xylene, benzene; mixtures of ketone/aromatics such as MEK/toluene; halogenated $C_1$-$C_4$ hydrocarbons such as methylene chloride, dichloroethane and mixtures thereof. Dewaxing solvents of choice are the ketones, and ketone/aromatic mixtures, such as MEK/MIBK, MEK/toluene.

Regardless of the procedure employed, once the waxy oil/solvent mixture is chilled to the wax separation temperature the precipitated wax is separated from the wax/oil/solvent slurry via conventional liquids/solids separation procedures which typically include by way of illustration and not limitation, filtration and centrifugation.

The dewaxed oil/solvent mixture must now be separated into its respective oil and solvent components, the recovered oil being used either directly or sent on for further processing and the recovered solvent being recycled to the dewaxing process.

Typical oil/solvent separation is performed by distillation. Since solvent dewaxing typically employs solvent to oil ratios of anywhere from 1:1 to 10:1, more typically 3:1 to 6:1 (depending on the technique employed and the type of oil being processed) this means that tremendous volumes of liquids must be processed. Distillation, by its very nature, is an energy intensive operation. Selective permeation of the solvent through a membrane barrier is a technique which can be employed to reduce energy consumption and processing costs. However, despite the general statement that membrane permeation can be used for liquid/liquid separations, it must be understood that actual practice is much more complicated than the simply stated theoretical solution. The membranes used must be inert to the solvent and the oil, that is, must not dissolve in oil or solvent. Further, even if one fortuitously finds a material which does not dissolve in the system to be processed this is not enough. The membrane material must be capable of effecting a separation and further, the separation must be performed at a high enough rate and yield a permeate of high enough purity to be economically viable for commercial application.

Polyimide membranes, as prepared by Membrane Systems, Inc. (MSI) according to U.S. Pat. No. 4,307,135, have been disclosed in copending application Attorney Docket Number OP 2858 U.S. Ser. No. 494,281, filed May 13, 1983, hereby incorporated by reference, as having utility for the separation of dewaxing solvents containing ketone from dewaxed oil with good selectivity and moderate flux. The membrane furnished by MSI, however, suffered from the disadvantage of being not reproducibly consistent in performance, were fragile, and difficult to wind into spiral-wound membrane modules and were prone to develop cracks. It has been discovered, and forms the basis of the present invention that polyimide membranes of reproducible very high flux, high selectivity, mechanical toughness, resistance to cracking and which are capable of being easily wound into large spiral-wound element can be produced for use in organic liquid separations, especially the separation of dewaxing solvent containing ketone from dewaxed oil by following the specific membrane casting procedures and limitations disclosed in the present invention.

Organic liquid mixtures, particularly dewaxing solvent/dewaxed oil mixtures, can be separated by pressure driven permeation through an asymmetric polyimide membrane possessing high flux and high selectivity which asymmetric polyimide membrane is prepared by the procedure comprising:

1. dissolving from about 14–30 wt.% undegraded polyimide copolymer preferably about 16–25 wt.% more preferably about 18–24 wt.% polyimide polymer most preferably 18–22 wt.% (as described in greater detail below) in a dual solvent system comprising an anti-solvent and a prosolvent which solvents are employed at an anti-solvent:prosolvent ratio of about 10:1 (or more)–1:1, preferably about 8:1–1.5:1, more preferably about 7:1–1.5:1 to about 7:1–2:1, most preferably about 7:1–3:1 to form a casting solution,
2. generating a thin layer of the polymer-solvent solution mixture;
3. partially evaporating the solvent from the polymer-solvent mixture layer for a time sufficient to permit formation of a thin active layer;
4. immersing the evaporated polymer-solvent mixture layer in a gelation bath to form the asymmetric membrane.

The higher solvent pair ratios, eg 8:1 to 10:1 or more can be utilized when employing polyimide polymer which has been recovered from its nonaqueous production solution by use of a nonaqueous precipitation anti-solvent (eg acetone), described in greater detail below.

One can be certain that, for the purposes of this invention, the polymer is in the undegraded form if the polymer during manufacture has been produced in a nonaqueous solvent such as DMF and then precipitated using a nonaqueous anti-solvent such as acetone or, if precipitated in an aqueous solvent the polymer is immediately (i.e. within a short period of time) isolated and recovered from the aqueous solvent. Polyimide polymer which is permitted to stand in water for an extended period of time yields a membrane of very poor performance characteristics, (see Example 1, Sample B).

The polyimide polymer is an aromatic, fully imidized, and highly polar copolymer. The polyimide polymers described in U.S. Pat. No. 3,708,458 assigned to Upjohn are the polyimide polymers used in the present invention. The polymer is a copolymer derived from the co-condensation of benzophenone 3,3',4,4'-tetracarboxylic acid dianhydride (BTDA) and a mixture of di(4-aminophenyl)methane and toluene diamine or the corresponding diisocyanates, 4,4'-methylenebis(phenyl isocyanate) and toluene diisocyanate.

The obtained copolyimide has imide linkages which may be represented by the structural formulae:

AND wherein the copolymer comprises from about 10 to 90% I and 90 to 10% II, preferably about 20% I and about 80% II. Polymer preparation is described in U.S. Pat. No. 3,708,458.

As previously stated, in order to produce a membrane possessing high flux, high selectivity (in a reproducible and consistent manner) which is also highly durable and flexible, the polyimide starting material out of which the membrane is cast must be in a non degraded form. As used in the body of this specification and the accompanying claims the descriptive phrases "non degraded form" or "undegraded" means that the polyimide copolymer has been precipitated from its synthesis solution using a non aqueous solvent, or if isolated from its solution using water or an aqueous solvent, it must have been recovered from the water or aqueous solvent as quickly as possible to insure minimum polymer deterioration. To this end the best commercial sources of polyimide copolymer satisfying this requirement of the present invention are Upjohn Company's 2080D, which is an about 22% solution of the polymer in N,N-dimethylformamide (DMF) solvent and 2080 DHV which is an about 25% solution of the polymer in DMF solvent. These solutions are the polymerization reaction product solutions without further processing and are sold by Upjohn Company as such. The polyimide copolymer in this solution is recovered for use in the present membrane preparation procedure by precipitation from the DMF solvent using an anti-solvent which is nonaqueous and a non-solvent for the polymer, but which is miscible with DMF, e.g. methanol, acetone, MEK, toluene, preferably acetone. The polymer is redissolved in the appropriate pro-solvent/anti-solvent pair at the desired solvent ratio and polymer loading level to give a casting solution according to the teaching of the present invention suitable for the production of membranes.

Use of the polymer precipitated from the nonaqueous production solution, (for example DMF) eg 8:1 to 10:1 (or more). Lower solvent pair ratios, eg about 7:1 to 3:1, however, are still preferred.

The pro-solvent can be any solvent which is a good solvent for the polyimide polymer, but is preferably selected from the group dimethylsulfoxide (DMSO), N,N-dimethylformamide (DMF), N,N-dimethylacetamide (DMAC) and N-methylpyrrolidone (NMP) and mixtures thereof. DMF is preferred.

The anti-solvent can be any solvent in which the polymer is insoluble but compatible. Typical of such anti-solvents are simple organic solvents such as alcohols, ketones, ethers and esters. Methyl alcohol, acetone, dioxane, morpholine, sulfolane, γ-butyrolactone and ethyl acetate are examples of anti-solvents. Dioxane is preferred.

It is preferred that the solvents used in this membrane casting process be free of water. Even as little as 0.2 wt.% water in the solvent can be detrimental to the performance of the membrane.

The preferred solvent system of Dioxane/DMF (D/DMF) is used in a ratio of about 10:1 (or more)–1:1, preferably about 8:1–1.5:1, more preferably about 7:1–1.5:1 to about 7:1–2:1, most preferably about 7:1–3:1. The polymer is added to the mixed solvent system at a concentration of from about 14–30 wt.%, preferably about 16–25 wt.%, more preferably about 18–24 wt.% most preferably about 18–22 wt.%.

A thin film of the polyimide polymer/solvent mixture is then generated. This film may be generated by any method capable of forming a uniform thickness film, hence, extruding, spreading, drawing, etc. either by hand or by machine are all techniques which can be employed. The technique employed will determine the final form of the asymmetric polyimide membrane and since the membrane can be employed in the form of film sheets, tubes, hollow fibers, etc. The technique will vary with the final membrane form desired. It must also be noted when the polyimide membrane is cast in the form of an asymmetric film sheet the sheet may be cast onto a suitable porous backing to provide extra support for the membrane. This backing can take the form of any inert porous material which does not hinder the passage of permeate through the membrane and does not react with the membrane material, the casting solvent, the gelation bath solvent, or the organic materials which are being separated (e.g., the oil and/or dewaxing solvents). Typical of such inert porous backings (support materials) are metal mesh, sintered metal, porous ceramic, sintered glass, paper, porous nondissolving plastic, woven cloth such as rayon, asbestos, etc. This material does not participate or contribute to the separation, but rather merely functions as a support backing for the membrane.

The film of polyimide co-polymer/solvent mixture (regardless of form or method of generation) is allowed to partially evaporate some of the solvent before the film is finally gelled in a gelation bath and recovered for use.

Control of evaporation time is extremely important as it has been found that evaporation time determines the thickness of the active layer in the asymmetric membrane and, ultimately, the flux and selectivity of the membrane for the permeation process.

An evaporation time of 2 to 120 seconds can be used, but preferably shorter times are employed on the order of 2 to 60 seconds, more preferably 2 to 30 seconds, most preferably 2 to 20 sec. These evaporation times are based on ambient temperature and pressure under dry air to ambient humidity conditions.

While an evaporation time of, broadly, 2–120 sec. is recited, reference to the Examples shows that the longer times can be successfully employed when the anti-solvent/pro-solvent ratio is rather low. When the anti-solvent/pro-solvent ratio is high, long evaporation times tend to yield membranes possessing lower flux. Conversely, shorter evaporation times can be effectively employed with both the low and high ratio solvent pair solutions. With the Examples before him, it is left to the practitioner to choose that combination of solvent pair ratio and evaporation time out of the ranges presented which gives optimum result, it being understood that, in general, short evaporation times are preferred.

Following this critically controlled partial evaporation the polymer/solvent film is immersed in a gelation bath which functions to coagulate the material into a membrane film. Membranes can be gelled in any medium in which the polymer is insoluble, but in which both the pro-solvent and anti-solvent which makes up the dual solvent system is miscible. Typical of such gelation medium are water and acetone. Water is preferred. The gelation bath temperature can range from about 0° to +30° C. Although water is generally used in the membrane gelation step, to minimize degradation the membrane should be removed from the gelling bath immediately and dried by solvent exchange as described in detail below. Further, since the polyimide polymer is inherently unstable to hydrolysis, the pH of the gelation bath should be such as to avoid hydrolysis. Clearly, water gelation bath pH as close to neutral as possible is preferred.

Polyimide membranes can be used immediately as such after casting. However, they can also be treated with organic solvents to replace the gelation solvent (typically water) and to facilitate drying, storage, fabricating into elements and handling and to prevent membrane deterioration over extended periods of time (e.g. times longer than about 3 months), see for example GB 2,073,654A, GB 2,051,664A, EP 0023406 or Final Report by Membrane Systems Inc. to Office of Water Research & Technology Development of Chlorine Resistant Membrane, Asymmetric Polyimide Membrane and Porous Substrate, Sudak et al. under contract no. 14-34-0001-9515, September 1980, pp 153–234, pg. 209. Replacement of gelation water within 1–3 days is preferred to avoid problems in membrane handling, i.e. to keep membranes flexible, even though permitting the membranes to remain wet for longer times does not seriously degrade membrane performance (except for overlong periods such as 3 months). The gelation water retained in the membrane can be replaced using any water miscible solvent such as low molecular weight alcohol, ketones or mixtures thereof or mixtures of alcohols and/or ketones with glycols or glycerols, e.g. isopropyl alcohol/glycerol; polyethylene glycol, triethylene glycol, MEK, MIBK, MEK/MIBK etc. The glycerol or glycol exchanged membrane can then be air dried.

The polyimide membrane will be used in separation apparatus most suitable to the form of the membrane produced. For example, membranes in the form of films can be used in frame mounted separators to define a contacting feed zone (i.e., the zone which contacts the dense active layer side of the membrane with the feed) and a permeate zone. Alternatively, film membranes can be fabricated into spiral-wound membrane elements as embodied, for example, in U.S. Pat. Nos. 3,417,870, 3,173,867, 3,367,504, 3,386,583, and 3,387,790. Tubes and hollow fibers can also be employed in a suitably configured form (see for example U.S. Pat. No. 3,228,877) provided the feedstream is contacted with the dense active layer side of the membrane during use. The polyimide membrane will have an overall thickness of about 1 to 10 mils (25–250μ), more typically about 2–4 mils (50–100μ).

In the practice of the present invention the organic liquid mixture to be separated into components will be contacted with the dense active layer side of the polyimide membrane under pressure and at a temperature sufficient to effect the desired separation. Such contacting will typically be at about −50° to about +150° C., preferably about −30° to about +100° C., more preferably about −20° to about +70° C. The pressure employed will be at least greater than that sufficient to overcome the osmotic pressure of the solution, preferably there will be at least a net driving force of about 100 to 1500 psi (0.68 to 10.34 mPa) over the osmotic pressure, preferably a net driving force of about 200 to 600 psi (1.38 to 4.14 mPa) most preferably about 300 to 500 psi (2.07 to 3.45 mPa) net driving force.

A dewaxing solvent recovery process is also described employing the high flux, high selectivity asymmetric polyimide membrane described in the present invention which reduces the quantity of dewaxed oil/dewaxing solvent being fed to the conventional solvent recovery apparatus, be that apparatus a distillation unit or solvent stripping tower. By thus unloading such conventional solvent recovery units, tremendous energy saving can be secured. Further, solvent recovery via the membrane permeation scheme of the present invention tends to debottleneck unit operation and permits handling higher overall thru-put in the dewaxing plant at a relatively modest overall capital investment and at low energy costs. Typical dewaxing solvents include ketones having from 3-6 carbons, such as acetone, methyl ethyl ketone (MEK), methyl isobutyl ketone (MIBK); $C_6-C_9$ aromatic hydrocarbons such as toluene, xylene, benzene; mixtures of ketone/aromatics, such as MEK/Toluene; halogenated $C_1-C_4$ hydrocarbons such as methylene-chloride, dichloroethane and mixtures thereof, ethers, such as methyl tertiary butyl ether (MTBE) and mixtures of ketones and ethers, such as MEK/MTBE. Dewaxing solvents of choice are the ketones and ketone/aromatic mixtures such as MEK/MIBK, MEK/Toluene.

SPECIFIC EMBODIMENT

Figure 1:
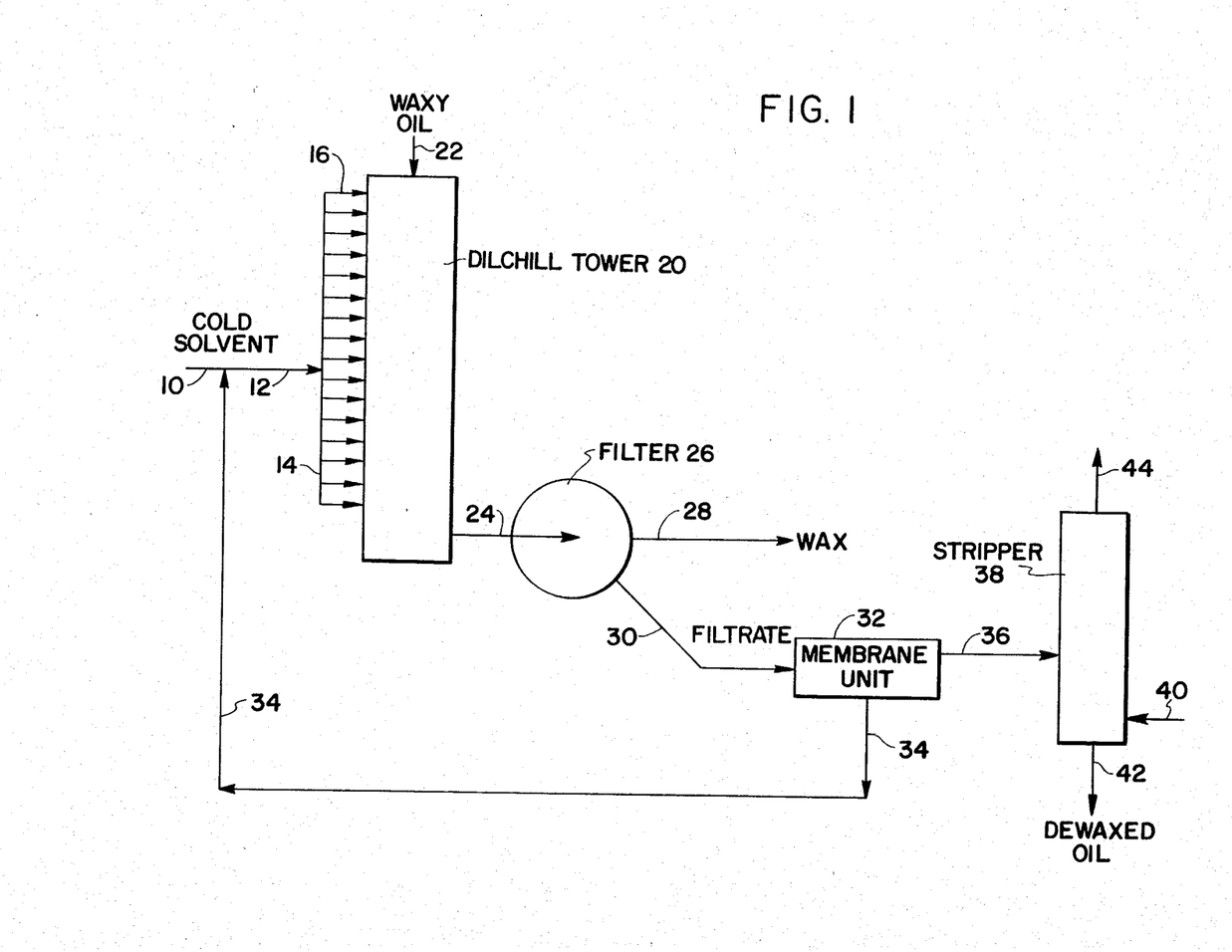
FIG. 1 is a schematic of the method of use of the present membrane in a separation procedure constituting an integrated hydrocarbon dewaxing process.

Referring to FIG. 1, a waxy lube oil stock at a temperature above its cloud point is introduced into the top of staged dewaxing tower 20 via line 22. Staged tower 20 contains multiple agitated stages for mixing the waxy oil with cold dewaxing solvent. Cold dewaxing solvent is introduced into tower 20 via lines 10 and 12, manifold 14 and multiple injection points 16. Each of the injection points introduces cold solvent into a particular stage wherein the cold dewaxing solvent is substantially instantaneously (i.e. one second or less) mixed with the waxy oil. As the waxy oil progressed down tower 20, it forms a slurry comprising solid particles of wax and a mixture of dewaxed oil and dewaxing solvent. This so-formed slurry is removed from tower 20 via line 24 and passed to filter 26. The cold slurry may be further chilled in a scraped-surface chiller (not shown) before it is passed to filter 26. Filter 26 is a rotary drum filter wherein the wax is separated from the slurry thereby forming a cake of solid wax and a filtrate comprising a mixture of dewaxed oil and dewaxing solvent. The wax is removed from filter 26 via line 28 and sent to further processing. The filtrate is passed via line 30 to at least one membrane unit 32 wherein it is contacted, under pressure, with the dense active layer side of an asymmetric polyimide membrane at a pressure across the membrane ranging from about 100 to 1500 psi above the osmotic pressure. A substantial portion of the dewaxing solvent preferentially permeates through the membrane to form a solvent-rich permeate and an oil-rich retentate. The solvent-rich permeate is recycled back into tower 20 via line 34 and the retentate is passed for further solvent removal to stripper 38 via line 36. In stripper 38 the retentate is contacted with a stripping gas entering via line 40 which removes residual solvent from the retentate to form a solvent-free dewaxed oil which is removed from the bottom of the stripper via line 42. The stripping gas containing the residual solvent leaves the top of the stripper via line 44. Alternatively the retentate may be sent to a distillation unit (not shown) for separation into a solvent rich stream and a purified oil stream.

It is understood, of course, that the membrane unit will contain a number of membrane elements which may be arranged in parallel and/or series configurations.

EXAMPLE 1

Membrane casting solutions prepared from 2080 polyimide polymer, that was processed in three different ways, were prepared. 20 wt.% polymer was dissolved in 5:1 solutions of Dioxane/DMF. The membranes were hand cast using a doctor blade. Gelation was in a water bath. Two different evaporation times were employed. The ketone/oil mixture was 25 wt.% 150N oil in 60:40 MIBK/MEK. Separation conditions were an applied pressure of 2758 KPa (~400 psi) and a temperature of about 23° C. The results are presented below.

| Polyimide Polymer | A | | B | | C | |
|---|---|---|---|---|---|---|
| Evaporation Time (Sec) | 2 | 100 | 2 | 100 | 2 | 100 |
| Permeation Rate ($1/m^2 \cdot day$) | 1406 | 80 | 802 | (1) | 1445 | 178 |
| Oil Rejection (%)(2) | 94 | 88 | 12 | (1) | 99 | 96 |

(1) Membrane cracked under pressure.

(2) Rejection % (R %) = $\frac{[Oil \%] Feed - [Oil \%] Permeate \times 100}{[Oil \%] Feed}$ Polyimide polymer C was recovered from Upjohn 2080 DHV, a solution of 25% polyimide polymer in DMF by the following procedure. One liter of the Upjohn 2080 DHV solution was transferred into a 3.8 liter Waring blender. 300 ml of acetone was added into the blender on top of the polymer solution. The mixture was blended at the low setting for about 5 minutes whereby a viscous slurry was formed. Another 300 ml of acetone was added and the mixture blended at the low setting for about another 5 minutes. A low viscosity slurry is formed with the polymer as a fine suspension. A further 300 ml acetone is added with blending for 5 minutes at the low setting. The blender contents were emptied into a 3 liter container and allowed to settle. The liquid was decanted off and 1.5 liters of acetone added and the mixture stirred thoroughly. The mixture was filtered through a coarse filter (Whatman #4). The polymer was washed by remixing with another 2 liter of acetone. After filtering the polymer was dried in vacuum (15 inches Hg) at 45°-60° C. for 3 hrs. The polymer powder is then ready for use.

It is well-known that polyimides are inherently unstable towards hydrolysis (see Polymer Letters Vol. 13, pg 701-709, 1975). Therefore, if the polymer is isolated from its solution using water as the anti-solvent or is precipitated in water and then exposed to water or moist air for an appreciable time prior to use or granulation, significant degradation of the polymer can result. (see sample B). The uncertainties associated with polymer handling explain the differences in the performance of membranes produced from dry polymer samples A and B. It is believed Sample A was precipitated in water by the manufacturer, but not permitted to stand for too long a time in the water prior to granulation, whereas it is believed Sample B, also precipitated in water, was left water wet for an appreciable length of time before granulation (granulation is conducted at an elevated temperature thereby drying the polymer and driving off the water).

As can be seen, care must be taken to insure the polymer is not exposed to water for too long a time. It is preferred that the polymer be produced in a nonaqueous solvent and then recovered using a nonaqueous anti-solvent, as described above for the 2080 DHV polymer sample C.

In the following examples, except where otherwise indicated, the dry granulated powder polymer used to produce the membrane is either from the same lot as that used in Example 1 sample A or is from lots which are believed to have been handled in a substantially similar manner as the material of Example 1, sample A, the material in all instances being undegraded polyimide.

EXAMPLE 2

(Effect of Evaporation Time on Membrane Performance)

A membrane casting solution consisting of 20 wt.% 2080PI, 13% DMF and 67% dioxane (D/DMF 5:1) was prepared. The solution was hand cast onto a glass plate using a draw down blade with a 125$\mu$ (5 mil) gap. After a predetermined air evaporation time, the assembly was immersed in water at 20° C. The membrane was freed from the glass surface in the water gelation bath in a few minutes. These membranes were tested in a standard permeator apparatus to give the following results:

| Sample #(1) | 1 | 2 | 3 | 4 |
|---|---|---|---|---|
| Air Drying Time (sec) | 2 | 10 | 30 | 60 |
| Feed Oil Concentration (%) (2) | 25 | 25 | 25 | 25 |
| Permeation Rate (1/m$^2$ · day) | 812 | 667 | 352 | 290 |
| Oil Rejection (%) | 95.2 | 97.0 | 86.0 | 88.0 |

(1) The pressure across the membrane was 2750 KPa (400 psi); contacting temperature ~23° C.
(2) The feed was a 150 N oil in MIBK/MEK (60:40)

EXAMPLE 3

(Effect of Polymer Concentration on Membrane Performance

Membrane casting solutions consisting of 16-22 wt.% 2080PI, 13% DMF and 67% dioxane (D/DMF 5:1) were prepared. Membranes were hand cast from these solutions as in Example 2 with an air evaporation time of 2 seconds. These membranes were tested under the same conditions as in Example 2 to give the following results:

| Sample # | 5 | 6 | 7 | 8 |
|---|---|---|---|---|
| 2080PI Concentration (%) | 16 | 18 | 20 | 22 |
| Feed Oil Concentration (%) | 25 | 25 | 25 | 25 |
| Permeation Rate (1/m$^2$ · day) | 995 | 861 | 794 | 825 |
| Oil Rejection (%) | 75.5 | 89.0 | 95.2 | 94.0 |

EXAMPLE 4

(Effect of Gelling Bath Temperature)

Membranes were hand cast from a solution containing 20 wt.% 2080PI, 13% DMF and 67% dioxane (5:1 D/DMF) with an air drying time of 10 seconds. These membranes were gelled at 2°-23° C. in water. They were tested under the same conditions as in Example 2 to give the following results:

| Sample # | 9 | 10 |
|---|---|---|
| Gelling Bath Temperature, °C. | 23 | 2 |
| Feed Oil Concentration (%) | 25 | 25 |
| Permeation Rate (1/m$^2$ · day) | 658 | 610 |
| Oil Rejection (%) | 97.0 | 95.0 |

EXAMPLE 5

(Effect of Membrane Physical Thickness)

Membrane casting solution from Example 2 was used to prepare membranes using draw down blades with 125$\mu$ (5 mil) and 175$\mu$ (7 mil) gap widths. Air evaporation time for these membranes was 10 seconds. They were tested under the same conditions as in Example 2 to give the following results:

| Sample # | 11 | 12 |
|---|---|---|
| Blade Gap Width (mils) | 5 | 7 |
| Membrane Thickness (mils) | 2 | 3.5 |
| Permeation Rate (1/m$^2$ day) | 543 | 535 |
| Oil Rejection (%) | 93 | 94 |

EXAMPLE 6

The membrane casting solution from Example 2 was used to prepare membranes using a draw down blade with a 7 mil gap width. Air evaporation time for these membrane was 2 seconds. They were tested under the same conditions as in Example 2 on oil/toluene/MEK system to give the following results:

| Sample # | 13 | 14 | 15 | 16 |
|---|---|---|---|---|
| Pressure (Kpa) | 1380 | 2750 | 2750 | 2750 |
| Toluene/MEK Ratio | 30:70 | 30:70 | 50:50 | 70:30 |
| Permeation Rate (1/m$^2$ · day) | 529 | 1158 | 920 | 745 |
| Oil Rejection (%) | 91.0 | 95.0 | 94.0 | 93.0 |

EXAMPLE 7

A symmetric regenerated cellulose membrane (ENKA PM250; 17.5$\mu$, about 12,000 MWCO) was tested under the same conditions as in Example 2 and compared to the membranes prepared as described in the present invention in the following table:

| Sample # | 1 | ENKA PM250(3) |
|---|---|---|
| Permeation Rate (1) (1/m$^2$ day) | 812 | 320 |
| Permeation Rate (2) (1/m$^2$ day) | 794 | 320 |
| Oil Rejection (1) (%) | 95.2 | 54 |
| Oil Rejection (2) (%) | 95.2 | 54 |

(1) Results on fresh membranes
(2) Results on membranes after three months storage in water
(3) The regenerated cellulose membrane was sequentially permeated using water flush, then methanol then methyl ethyl ketone at 400 psi prior to evaluations on feed.

EXAMPLE 8

A membrane casting solution consisting of 19 wt.% 2080 polyimide polymer and 1.5:1 D/DMF was prepared. The solution was hand cast onto a glass plate using a casting knife with a 7 mil gap. After a period of evaporation in air the assembly was immersed in a water gelation bath. The membranes were tested at an applied pressure of 2758 KPa (400 psi) and a temperature of about 23° C. The ketone/oil mixture consisted of 25 wt.% 150N oil in 60:40 MIBK/MEK. The results are presented below.

Low Dioxane/DMF Ratio (1.5:1)

| Sample # | 17 | 18 | 19 | 20 | 21 |
|---|---|---|---|---|---|
| Evaporation Time (Sec) | <2 | 60 | 90 | 120 | 150 |
| Permeation Rate ($1/m^2 \cdot day$) | 1800 | 1530 | 1518 | 1375 | <9 |
| Oil Rejection (%) | 70 | 91 | 88 | 91 | — |

In sample 21 the evaporation time was so long that too dense an active layer was formed which was effectively impermeable to the ketone/oil system.

Comparing the results of Examples 8 and 2 it is seen that the longer evaporation times which can be tolerated when one is using a low D/DMF ratio solvent should be avoided when one is using a high ratio of D/DMF solvent since flux tends to fall off with longer times. See also Example 12(b).

EXAMPLE 9

A membrane casting solution of 19 wt.% 2080 polyimide polymer in a 2:1 dioxane/DMF solvent system was prepared and machine cast. A dry air evaporation time of about 18 sec. was employed. The casting solution was deposited on a nylon support cloth moving at a rate of about 4.5 feet/min. The casting knife was about 18 inches from the water gelation bath which was at a temperature of about 1.4° C. Prior to use on the ketone/oil mixture the membrane was flushed with MEK. The ketone/oil mixture was about 30 wt.% 150N oil in MEK/MIBK 1:1. Separation contacting conditions were an applied pressure of about 2758 KPa (400 psi) and a temperature of about 23° C. The membrane had a flux of about 1078 l/$m^2$-day and an oil selectivity of about 96.8% rejection.

From this and the preceeding examples 2, and 8 it can be seen that shorter evaporation times are preferred.

EXAMPLE 10

A membrane casting solution of 19 wt.% 2080 polyimide polymer in 2:1 D/DMF solvent was machine cast. A dry air evaporation time of about 15 sec. was employed. The resulting membranes after gelation in a water bath at 1.4° C. were solvent exchanged to remove the water using various exchange solvents and air dried at ambient conditions. The resulting membranes mounted in the test cell were then flushed with MEK and then tested for the separation of 30 wt.% 150N oil from MEK/MIBK 1:1 at 400 psi at ambient temperature. The results are presented below:

| Soak Medium | Flux $1/m^2 \cdot day$ | Oil Rejection % |
|---|---|---|
| Methanol-glycerol | 1078 ± 28 | 91.9 ± 0.7 |
| Ethanol-glycerol | 920 ± 5 | 91.8 ± 0.7 |
| Isopropyl Alcohol-glycerol | 920 ± 5 | 97.1 ± 0.2 |
| Isopropyl Alcohol-Triethylene glycol | 860 ± 15 | 93.5 ± 1.0 |
| Isopropyl Alcohol-Polyethylene glycol | 907 ± 25 | 90.1 ± 0.5 |

EXAMPLE 11

A membrane casting solution of 19 wt.% 2080 polyimide polymer in 4.6:1 D/DMF solvent was hand cast. An evaporation time of about 8-10 sec sec was employed. Gelation was in water at ambient temperature. The solvents contained varying amounts of water. The membranes (mounted in test cells and flushed with MEK) were tested on 30 wt.% 150N oil in MEK/MIBK 1:1 under conditions of pressure and temperature previously recited. The average results are presented below:

| Sample | % Water in Casting Solvents | Flux ($1/m^2 \cdot day$) | Rejection % | Membrane Thickness (mils) |
|---|---|---|---|---|
| 22 | 0 | 574 ± 32 | 98.9 ± 0.1 | 3.0 ± 0.2 |
| 23 | 0.10 | 575 ± 45 | 96.1 ± 1.0 | 2.8 ± 0.1 |
| 24 | 0.20 | 390 ± 40 | 96.6 ± 0.7 | 3.0 ± 0.2 |
| 25 | 0.30 | 405 ± 50 | 99.0 ± 0.5 | 3.2 ± 0.2 |

EXAMPLE 12(a)

A membrane casting solution of 19 wt.% polymer in 1.5:1 D/DMF was prepared and cast. Dry air evaporation time of 100 seconds and 107.5 seconds were employed. Different casting speeds (i.e. moving nylon casting belt speed under the knife spreader and into the water gelation bath) were used to determine what effect if any there would be. Ketone/oil feed and contacting separation conditions are as in Example 9. The membranes were MEK flushed in the test cell prior to use. The results are presented below:

| EFFECT OF CHANGING CASTING SPEED | | | |
|---|---|---|---|
| Experiment | 26 | 27 | 27A* |
| Evaporation Time (S) | 100 | 100 | 107.5 |
| Casting Speed (ft/min) | 1.5 | 3.0 | 1.0 |
| Permeation Rate ($1/m^2 \cdot day$) | 1010 ± 26 | 1043 ± 90 | 1491 ± 100 |
| Oil Rejection (%) | 82.4 ± 3.0 | 81.9 ± 0.7 | 50.4 ± 4 |
| Thickness mils (membrane + support cloth) | 13.8 ± 0.4 | 14.0 ± 0.1 | 13.7 ± 0.2 |

*Membrane had numerous wave marks on the surface

12(b) An additional experiment was conducted using a casting solution of 18 wt.% polymer in D/DMF 4:1. Evaporation times and casting speeds were varied as indicated. Dry air was maintained over the cast films and gelation was in tap water at 18° C. Test conditions were as above. The results are presented below:

| EFFECT OF CHANGING EVAPORATION TIME/CASTING SPEED | | | | | |
|---|---|---|---|---|---|
| Experiment | 28 | 28A | 29 | 30 | 31 |
| Evaporation Time (S) | 107.5 | 53.8 | 35.8 | 21.5 | 14.3 |
| Casting Speed (ft/min) | 1 | 2 | 3 | 5 | 7.5 |
| Permeation Rate ($1/m^2 \cdot day$) | 694 ± 9 | 828 ± 6 | 842 ± 2 | 875 ± 16 | 936 ± 12 |
| Oil Rejection (%) | 98.1 ± 0.2 | 95.9 ± 0.3 | 95.8 ± 0.1 | 94.2 ± 0.2 | 92.7 ± 0.4 |

These examples show the relatively broad range of evaporation times and casting speeds which can be employed to produce a membrane of acceptable performance.

EXAMPLE 13

Membranes of the same batch (hand cast) as those tested in Example 1 were evaluated for performance in water desalination applications. 5000 ppm NaCl in water was employed as the test solution. Contacting-separation conditions were an applied pressure of 2758 KPa (400 psi) at 23° C. The results are presented below:

| Polyimide Polymer | A | | B | | C | |
|---|---|---|---|---|---|---|
| Evaporation Time (Sec) | 2 | 100 | 2 | 100 | 2 | 100 |
| Permeation Rate ($1/m^2 \cdot$ day) | 918 | 270 | 2045 | 145 | 2460 | 215 |
| NaCl Rejection (%) | 58 | 85 | 66 | 79 | 45 | 91 |

From the above and by comparison with Example 1 it is readily seen that those membranes which possess outstanding ketone/oil separation capabilities are somewhat inferior desalination membranes, while those membranes which are totally unsatisfactory for ketone/oil separations (due to low flux and/or low selectivity) are acceptable desalination membranes, see especially Sample B.

EXAMPLE 14

(Element Fabrication & extended test use)

In the practice of the separation of dewaxing solvent containing ketone from dewaxed oil the membrane preferably will be employed in the form of a spirally wound membrane element. In fabricating such spiral wound elements various adhesives, spacers, backings, seals, etc. are employed. In the present example the spiral wound element comprised layers of polyimide membrane (prepared as described herein) wound around a metal central tube containing holes for the permeate, the membrane layers being separated by alternate layers of a permeate carrier, knitted Simplex (Dacron, with melamine formaldehyde stiffener) and a feed spacer made of Vexar (a polypropylene mesh). Membrane layers are sealed along the edge using an epoxy adhesive to sandwich the permeate carrier into a closed envelope in fluid communication with the perforated central tube, leaving the perforations in the central tube as the only permeate outlet. The epoxy adhesive comprises a ketone resistant resin formulation comprising (1) Epon 828 which is a reaction product of bisphenol-A and epichlorohydrin, (2) Cabosil M5, (3) Versamid 140 (a polyamide curing agent) (4) Estane 5707F-1 (a polyurethane from B. F. Goodrich) and (5) DMF solvent wherein the components 1/2/3/4/5 are present in a relationship based on parts by weight of about 100/10/60/4/12, which cures at about 25° C. over about a 21 day period. This adhesive system is described and claimed in copending application Attorney Docket No. OP 2993, U.S. Ser. No. 494,409, filed May 13, 1983 in the names of William M. King and William W. Wight. The layers of membrane, permeate carrier and feed spacer were wound around the central tube in a fashion consistent with preparing a spiral wound element. After the element is cured, the ends of the element are trimmed; a nylon seal carrier and a nylon anti-telescoping device are then added. The element is then covered on the outside with an epoxy reinforced fiberglass outer wrap.

Polyimide membrane was prepared using the polymer of Sample A in Example 1. The casting dope containing 19 wt.% polymer in dioxane/DMF (4:1). The membrane, machine cast, was permitted to evaporate for 15 sec. in dry air prior to gelation in a water bath. The resulting membrane was dried by solvent exchange using a glycerol (10 vol.%) isopropyl alcohol solution and wound into a spiral wound membrane element as described above. The element had a dimension of about 8 inches by about 40 inches and had about 225 square feet of membrane area. The polyimide membrane element was evaluated for the separation of different grades of dewaxed oil from dewaxing solvent which was MIBK/MEK at a ratio of about 60:40 at a test pressure of 2758 KPa (~400 psi) and temperature of 45° C. over a period of six months. The results are presented below:

| Oil Grade | % oil in feed | Flux ($1/m^2 \cdot$ day) | Oil Rejection (%) |
|---|---|---|---|
| 60 N | 30 | 550 | 95 |
| 150 N | 30 | 600 | 96 |
| 600 N | 20 | 800 | 98 |

EXAMPLE 15

Samples of polyimide membrane were machine cast using a casting solution of 18 wt.% 2080 polymer in 4:1 D:DMF solvent. The casting solution was deposited on a nylon support cloth moving at a rate of about 3.5 feet/min. The atmosphere over the casting knife was kept solvent saturated using a closed box. The atmosphere over the freshly cast film was dry air circulating at about 15 ft$^3$/min. and the evaporation time in the atmosphere was about 25 sec. The film was gelled in water at about 23.5° C. at about pH 7.0. The gelled membrane was rinsed in water at pH 7.0 at about 23.5° C. The resulting membrane (wet) plus nylon cloth backing had a thickness of about 13.5±0.02 mils.

This membrane was evaluated for wet storage behavior for the separation of 30 wt.% 150N oil from 1:1 MEK/MIBK at 2750 KPa (~400 psi) at ambient temperature (~23° C.). The membrane was rolled up and stored wet at the end of the casting run. Samples were taken at various times from the beginning and from the end of the roll. The results are presented below.

EFFECT OF WET-STORAGE ON 2080 PI MEMBRANE

| Days of Wet Storage | Location on Roll | Observations Made of Membrane Samples Removed From Test Cell | Flux ($1/m^2$-day) | % Oil Rejection |
|---|---|---|---|---|
| Control | Beginning | Normal, can be folded | 987 ± 10 | 97.0 ± 1.0 |
| | End | Normal, can be folded | 1025 ± 6 | 97.2 ± 0.4 |
| 1 | Beginning | Normal, can be folded | 1093 ± 12 | 96.7 ± 1.4 |
| | End | Normal, can be folded | 1030 ± 50 | 97.5 ± 0.7 |
| 2 | Beginning | Compression wrinkles | 1070 ± 30 | 96.7 ± 1.1 |
| | End | Compression wrinkles | 1050 ± 25 | 97.9 ± 0.3 |
| 4 | Beginning | Compression wrinkles | 1050 ± 30 | 93.3 ± 0.2 |

-continued

| EFFECT OF WET-STORAGE ON 2080 PI MEMBRANE | | | | |
|---|---|---|---|---|
| Days of Wet Storage | Location on Roll | Observations Made of Membrane Samples Removed From Test Cell | Flux (1/m²-day) | % Oil Rejection |
| | End | Compression wrinkles | 1035 ± 10 | 96.0 ± 0.2 |
| 6 | Beginning | Broke when folded | 1085 ± 15 | 95.9 ± 0.7 |
| | End | Broke when folded | 1070 ± 25 | 97.3 ± 0.2 |
| 14 | Beginning | Broke when folded | 1130 ± 30 | 96.6 ± 0.7 |
| | End | Appeared normal | 1090 ± 60 | 97.9 ± 0.2 |

From this it can be seen that wet storage beyond two days, while not significantly affecting the flux and rejection performance of the membrane, is detrimental to the mechanical handling performance of the membrane.

EXAMPLE 16

Three membranes were prepared using polyimide polymer recovered as described in Example 1 for polymer sample C (2080 DHV precipitated from production solution (DMF solvent) using a nonaqueous anti-solvent). The membrane was machine cast using the procedures and had the performance characteristics, presented below. Flux and oil rejection were evaluated using 30 wt.% 150N oil in MEK/MIBK 1:1 at 400 psig at ambient temperature (~23° C.). The membranes, mounted in the test cell were MEK flushed prior to testing.

| Sample | 32 | 33 | 34 |
|---|---|---|---|
| Polyimide Conc. (wt. %) | 24 | 20 | 25 |
| D/DMF ratio | 6:1 | 8:1 | 4:1 |
| Evap. Time (Sec.) in dry air at 15 ft³/min | 21.5 | 21.5 | 21.5 |
| Casting Speed (ft/min.) | 5 | 5 | 5 |
| Water Gel Bath Temp. (°C.) | 18 | 18 | 18 |
| Thickness (Membrane & Support) | 13.5 mil | 12.5 mil | 14.6 mil |
| Thickness, Membrane* | 5 mil | 5 mil | 5 mil |
| Flux (1/m² · day) | 798 ± 20 | 933 ± 14 | 848 ± 21 |
| Oil Rejection (%) | 96.2 ± 0.1 | 92.5 ± 1.3 | 96.4 ± 0.7 |

*Membrane thickness determined after removal of the support from the membrane/support as cast.

EXAMPLE 17

Five membranes were machine cast using solutions whereby the D/DMF ratio was varied between 4:1 to 8:1 and the polyimide polymer concentration was held constant at 20 wt.%. The polyimide polymer used was recovered from 2080 DHV as described in Example 1 for polymer sample C (precipitated from production solution (DMF solution) using nonaqueous anti-solvent). Machine casting was at a speed of 5 feet/min. into a water gel bath at 18° C. after a dry air evaporation time of about 21.5 seconds. The membranes so produced were evaluated on 30 wt.% 150N oil in MEK/MIBK 1:1. Separation was conducted at 400 psig at ambient temp. (~23° C.). Prior to use the membrane (attached to the backing) was flushed with MEK at up to 400 psig at ambient. The results are presented below.

| Sample | 35 | 36 | 37 | 38 | 33 |
|---|---|---|---|---|---|
| D/DMF ratio | 4:1 | 5:1 | 6:1 | 7:1 | 8:1 |
| Thickness (mils) (Membrane & Support) | 14.3 ± 0.2 | 12.4 ± 0.2 | 12.6 ± 0.4 | 12.2 ± 0.2 | 12.5 ± 0.1 |
| Thickness, (Membrane)* | 150 | 110 | 130 | 100 | 120 |
| Solution Viscosity (Centipoise)** | 2900 | 3200 | 3600 | 3800 | 4000 |
| Flux (1/m² · day) | 1367 ± 22 | 1006 ± 16 | 963 ± 6 | 953 ± 12 | 933 ± 14 |
| Oil Rejection (%) | 80.2 ± 1.4 | 88.2 ± 1.4 | 92.9 ± 1.0 | 94.6 ± 0.5 | 92.5 ± 1.3 |

*Membrane thickness determined after removal of the support from the membrane/support as cast.
**Determined using a Brookfield Viscosimeter RVT, #6 spindle 50 RPM, ~23° C.

These membranes were optically examined under 125× power magnification. The observations are reported below.

| EFFECT OF D:DMF RATIO ON VOID FORMATION IN MACHINE-CAST PI MEMBRANES AT A CONSTANT POLYMER CONCENTRATION OF 20 WT. % | | | | | | |
|---|---|---|---|---|---|---|
| | | Solution | Membrane | Top View (125×) | | |
| Sample | Ratio D:DMF | Viscosity (cps) | Thickness (microns) | No. of Voids | Size (microns) | Edge View (125×) Type of Voids (shape) |
| 35 | 4:1 | 2900 | 150 | 300 | 40-50 | Finger-like & irregular |
| 36 | 5:1 | 3200 | 110 | 14-15 | 20-50 | Irregular |
| 37 | 6:1 | 3600 | 130 | 10-15 | 40-50 | Irregular |
| 38 | 7:1 | 3800 | 100 | 7-14 | 50-60 | Irregular |
| 33 | 8:1 | 4000 | 120 | 5-14 | 50-60 | Irregular |

EXAMPLE 18

Two membranes were cast using the same casting solution, one by hand, the other by machine. The casting solution comprises 20 wt.% polyimide polymer (of the type recovered from 2808 DHV as described in Example 1 for polymer sample C precipitated from production DMF solution using nonaqueous anti-solvent [acetone]) in 4:1 D:DMF. This casting solution had a viscosity of 2300 cps as determined by Brookfield RVT, spindle No. 6@50 rpm, 23° C.

The machine cast membrane was cast upon a nylon cloth; casting speed was 5 ft/min., casting knife gap was adjusted to give a thickness of about 13 mils (membrane plus backing). Dry air was maintained over the casting knife and fresh cast film. Evaporation time in dry air was about 21.5 sec. Gelation was in tap water at 18° C. The membrane was compared with membrane hand cast using the same casting solution. Comparison was on 30% 150N oil in 1:1 MEK/MIBK at 400 psig at ambient temperature. The membranes, mounted in the test cell, were flushed with MEK prior to testing. The results are presented below.

| OIL-KETONE SEPARATION PROPERTIES MACHINE-CAST VERSUS HAND-CAST PI MEMBRANES | | | | |
|---|---|---|---|---|
| Sample | Method of Preparation | Flux (1/m²-day) | % Oil Rejection | Thickness (mils) |
| 39 | Machine-cast | 1245 ± 148 | 59.8 ± 9.7 | 13.1 ± 0.3* |
| 40 | Hand-cast | 907 ± 9 | 91.2 ± 0.5 | 4.1 ± 0.1 |

*Membrane plus support cloth

The machine cast membrane was examined to determine the reasons for its low performance. Optical inspection of a cross-section at 125× magnification revealed the substructure contained numerous irregularly shaped voids and "finger like" voids. Some of the voids pierced the active layer of the membrane. The hand-cast membrane was examined and seen to contain bubble like voids, but not fingering.

EXAMPLE 19

A series of membranes was machine-cast using polyimide polymer recovered from 2080 DHV (as described in Example 1). This series was compared with a control membrane produced using an undegraded granular 2080 polyimide. Polymer concentration was varied from 18 wt.% (control) to 21-25 wt.% (for polyimide recovered from 2080 DHV), with the solvent being 4:1 D:DMF. Machine casting was on a moving nylon belt, casting speed of 5 ft/min., 21.5 sec. evaporation time in dry air. Gelation was in tap water at 18° C. Dry air was maintained over the casting knife and freshly cast membrane. Viscosity was determined using Brookfield RVT viscosimeter at 22°-23° C. using a No. 6 spindle at 50 rpm. The membranes were evaluated in 30 wt.% 150N oil in 1:1 MEK/MIBK at 400 psig ambient temperature. The results are presented below.

| | EFFECT OF PI CONCENTRATION AT A CONSTANT D:DMF RATIO OF 4:1 | | | | |
|---|---|---|---|---|---|
| Membrane Number | Solution Viscosity (cps) | Polymer Concentration (wt. %) | Flux (1/m²-day) | % Oil Rejection | Thickness* (mils) |
| Control | 4600 | 2080 Control [18%] | 1140 ± 22 | 92.9 ± 0.5 | 13.5 ± 0.5 |
| 41 | 4200 | 21 | 1440 ± 10 | 70.8 ± 0.4 | 12.8 ± 0.1 |
| 42 | 5800 | 22 | 1355 ± 11 | 77.1 ± 0.8 | 13.1 ± 0.1 |
| 43 | 7400 | 23 | 989 ± 16 | 90.8 ± 1.0 | 13.2 ± 0.2 |
| 44 | 10,500 | 24 | 904 ± 29 | 96.3 ± 0.9 | 13.9 ± 0.2 |
| 45 | 13,800 | 25 | 848 ± 21 | 96.4 ± 0.7 | 14.6 ± 0.1 |

*Thickness of membrane plus support cloth

Each of the membranes evaluated above (except the control) were optically examined under 125× power magnification. The observations are reported below.

| EFFECT OF PI CONCENTRATION ON VOID FORMATION IN MACHINE-CAST PI MEMBRANES AT A CONSTANT D:DMF RATIO OF 4:1 | | | | | |
|---|---|---|---|---|---|
| Membrane Number | Polymer Concentration (wt. %) | Membrane Thickness (microns) | Top View (125×) No. of Voids | Size (microns) | Edge View (125×) Type of Voids (Shape) |
| 41 | 21 | 110 | 200 | 30-60 | Finger-like & irregular |
| 42 | 22 | 130 | 100 | 40-50 | Irregular |
| 43 | 23 | 110 | 50 | 20-40 | Irregular |
| 44 | 24 | 130 | 50 | 20-70 | Irregular |
| 45 | 25 | 120 | 25 | 10-70 | Irregular |

EXAMPLE 20

Another series of membrane was produced using polyimide recovered from 2080 DHV (as described in Example 1). In this series the concentration of polymer was varied from 21-24% and the solvent ratio was varied from 5.5:1 D:DMF to 6:1 D:DMF. A dry air atmosphere was maintained over the casting knife and freshly cast membrane. The membrane was cast on a moving nylon belt. Casting speed was about 5 ft/min. Evaporation time in dry air was about 21.5 sec. Gelation was in tap water at 18° C. Viscosity was measured on the Brookfield viscosimeter as previously described. The membranes were evaluated on 30 wt.% 150N oil in 1:1 MEK/MIBK at 400 psig at ambient temperature. The results are presented below.

| EFFECT OF VARYING THE PI POLYMER CONCENTRATION FROM 21 TO 24 WT. % AT D:DMF RATIOS OF 5.5:1 and 6:1 | | | | | | |
|---|---|---|---|---|---|---|
| Sample | Solution Viscosity (cps) | Polymer Concentration (wt. %) | Ratio D:DMF | Flux (1/m²-day) | % Oil Rejection | Thickness* (mils) |
| 46 | 4700 | 21 | 5.5:1 | 967 ± 22 | 91.1 ± 1.3 | 12.6 ± 0.2 |
| 47 | 6400 | 22 | 5.5:1 | 918 ± 26 | 93.5 ± 1.5 | 12.9 ± 0.0 |
| 48 | 9000 | 23 | 5.5:1 | 906 ± 26 | 95.8 ± 0.9 | 12.8 ± 0.1 |
| 49 | 11,600 | 24 | 5.5:1 | 843 ± 5 | 96.2 ± 0.1 | 13.4 ± 0.1 |
| 50 | 4800 | 21 | 6:1 | 974 ± 7 | 93.4 ± 0.3 | 13.1 ± 0.2 |

EFFECT OF VARYING THE PI POLYMER CONCENTRATION FROM
21 TO 24 WT. % AT D:DMF RATIOS OF 5.5:1 and 6:1

| Sample | Solution Viscosity (cps) | Polymer Concentration (wt. %) | Ratio D:DMF | Flux (l/m²-day) | % Oil Rejection | Thickness* (mils) |
|---|---|---|---|---|---|---|
| 51 | 6700 | 22 | 6:1 | 913 ± 73 | 94.7 ± 1.2 | 13.4 ± 0.1 |
| 52 | 8600 | 23 | 6:1 | 883 ± 4 | 95.1 ± 0.2 | 13.4 ± 0.1 |
| 53 | 11,600 | 24 | 6:1 | 798 ± 20 | 96.2 ± 0.1 | 13.5 ± 0.1 |

*Thickness of membrane plus support cloth

When the specimens of the membrane were viewed at 125× magnification, none of the finger-like voids could be found. All of the membranes had void counts of 5–13 when viewed from the top surface or "active layer". The voids were typically 30 to 60 microns in size. Review of the results of the previous examples shows that void count is suppressed by increasing the polymer concentration and by increasing the ratio of D:DMF. Moreover, the D:DMF ratio clearly has a more pronounced effect on void suppression and membrane performance than does the polymer concentration.

EXAMPLE 21

A membrane was machine-cast using 22 wt.% polyimide polymer recovered from 2080 DHV (as per Example 1) in 6:1 D:DMF. This casting solution was spread on a moving belt. Casting speed was 5 ft/min. A solvent atmosphere was maintained over the casting knife by means of a closed box. A dry air atmosphere (15 ft³/min.) was maintained over the freshly cast film. Evaporation time was 17 sec. Gelation was in water, pH 7, 19.5° C. The membrane was rinsed in water, pH 7, 18.5° C. The resulting membrane sheet was cut into 45, seven foot long leaves. The leaves were dried by immersion for 20 minutes in a 10 volume percent solution of glycerol in isopropanol followed by air drying to remove the isopropanol. The performance of wet versus dried membranes was evaluated using 30 wt.% 150N oil in 1:1 MEK/MIBK at 400 psig at ambient temperature. Membrane performance for representative leaves is reported below. Optical examination of 5 leaves of the membrane stripped from the support cloth revealed that the membrane had a void count of only 0.84 per cm².

PI MEMBRANE OIL-KETONE SEPARATION
PROPERTIES, WET VERSUS DRIED MEMBRANE

| Sample | Leaf No. | Wet or Dry | Flux (l/m²-day) | % Oil Rejection | Thickness* (mils) |
|---|---|---|---|---|---|
| 54 | 1 | Wet | 792 ± 88 | 96.7 ± 0.8 | 13.4 ± 0.1 |
| 54 | 1 | Dried | 667 ± 44 | 96.5 ± 0.2 | 12.9 ± 0.2 |
| 54 | 10 | Wet | 755 ± 63 | 97.4 ± 0.4 | 12.8 ± 0.4 |
| 54 | 10 | Dried | 615 ± 51 | 96.8 ± 0.8 | 12.8 ± 0.1 |
| 54 | 20 | Wet | 833 ± 47 | 96.3 ± 0.3 | 12.9 ± 0.1 |
| 54 | 20 | Dried | 725 ± 26 | 96.3 ± 0.3 | 12.9 ± 0.2 |
| 54 | 30 | Wet | 793 ± 41 | 96.8 ± 0.2 | 12.8 ± 0.1 |
| 54 | 30 | Dried | 731 ± 66 | 94.8 ± 0.3 | 13.0 ± 0.1 |
| 54 | 40 | Wet | 825 ± 76 | 96.8 ± 0.5 | 12.0 ± 0.1 |
| 54 | 40 | Dried | 848 ± 13 | 95.1 ± 0.5 | 12.5 ± 0.2 |

*Thickness of membrane plus support cloth

EXAMPLE 22

A study of polymer dedgradation was carried out at two temperatures, i.e., at room temperature (~23° C.) and at 60° C. Degradation in three different media were investigated. These include distilled water, tap water and ketone (acetone at room temperature and MIBK at 60° C.). Polymer degradation was monitored by recovering samples of polyimide from the aging medium periodically. Membranes were prepared from these aged samples and were then evaluated in terms of performance (flux and rejection) and stability in methyl ethyl ketone. Results for the room temperature and the 60° C. study are summarized in the tables below:

TABLE A

| | Polyimide Degradation Study at Room Temperature (~23° C.) | | | |
|---|---|---|---|---|
| Aging Time (Hours) | Aging Medium | Flux[2]/ m² day | Rejection % | Stability[3] in Ketone |
| 0[1A] | Tap Water | 938 | 94 | Pass |
| 506[1B] | Tap Water | 647 | 92 | Pass |
| 1010[1B] | Tap Water | 608 | 89 | Pass |
| 1346[1B] | Tap Water | 556 | 91 | Fail |
| 0[1B] | Acetone | 1409 | 92 | Pass |
| 168[1B] | Acetone | 1103 | 92 | Pass |
| 533[1B] | Acetone | 736 | 94 | Pass |
| 864[1B] | Acetone | 726 | 98 | Pass |
| 1316[1B] | Acetone | 515 | 96 | Pass |
| 0[1B] | Distilled Water | 1260 | 85 | Pass |
| 408[1B] | Distilled Water | 1339 | 91 | Pass |

[1A]Membrane casting solution formulation: Polyimide 20% Dioxane/DMF 5/1 Evaporation Time 2 sec.
[1B]Samples were cast using a 22% polyimide solution in 6/1 Dioxane/DMF.
[2]Flux and Rejection were determined by contacting the membrane with a mixture of 27 ± 1 wt. of 150 N oil in 40/60 MEK/MIBK at 23° C. and 400 psig.
[3]Membrane stability in ketone was determined by immersing the membrane sample in MEK with stirring at room temperature. If it survives >30 min., it is regarded as having passed the test.

TABLE B

| | Polyimide Degradation Study at 60° C. | | | |
|---|---|---|---|---|
| Aging Time (Hours) | Aging Medium | Flux[2] l/m² day | Rejection % | Stability[3] in Ketone |
| 0[1A] | Tap Water | 938 | 94 | [4] |
| 24[1B] | Tap Water | 900 | 89 | [4] |
| 48[1B] | Tap Water | 1050 | 93 | [4] |
| 72[1B] | Tap Water | 1184 | 92 | [4] |
| 168[1B] | Tap Water | — | — | [5] |
| 0[1B] | Distilled Water | 840 | 96 | Pass |
| 19[1B] | Distilled Water | 1018 | 98 | Pass |
| 49[1B] | Distilled Water | 750 | 98 | [6] |
| 74[1B] | Distilled Water | 703 | 98 | [6] |
| 90[1B] | Distilled Water | 871 | 97 | Fail |
| 115[1B] | Distilled Water | — | — | Fail |
| 26[1B] | MIBK | 479 | 96 | Pass |
| 74[1B] | MIBK | 490 | 92 | Pass |

TABLE B-continued

| Polyimide Degradation Study at 60° C. | | | | |
|---|---|---|---|---|
| Aging Time (Hours) | Aging Medium | Flux[2] l/m² day | Rejection % | Stability[3] in Ketone |
| 505[1B] | MIBK | 812 | 92 | Pass |

[1A]Membrane casting solution formulation: Polyimide 20% Dioxane/DMF 5/1 Evaportation Time 2 sec.
[1B]Samples were cast using a 22% polyimide solution in 6/1 Dioxane/DMF.
[2]Flux and Rejection were determined by contacting the membrane with a mixture of 27 ± wt. % 150 N oil in 40/60 MEK/MIBK at ~23° C. and 400 psig.
[3]Membrane stability in ketone was determined by immersing the sample in MEK with stirring at room temperature. If it survives >30 min., it is regarded as having passed the test.
[4]Ketone stability test not carried out.
[5]Membrane could not be formed from the casting solution.
[6]Borderline, membrane samples survive in ketone for approximately 30 minutes.

For those membranes reported in Tables A and B above which are reported as having failed the ketone stability test, but for which flux and rejection data is reported, the flux and rejection data were gathered during the period of time the membrane survived prior to when the membrane would have failed in the oil/ketone test feed.

What is claimed is:

1. A high flux, high selectivity reverse osmosis asymmetric polyimide membrane for effecting organic liquid separations prepared by the process comprising:
   (a) dissolving from 14-30 wt.% of an undegraded polyimide copolymer derived from the cocondensation of benzophenone 3,3',4,4'-tetracarboxylic acid dianhydride (BTDA) and a mixture of di(4 aminophenyl)methane and toluene diamine, or 4,4' methylenebis(-phenyl isocyanate) and toluene diisocyanate in a dual solvent system comprising dioxane anti-solvent and N,N-dimethylformamide (DMF) pro-solvent at an anti-solvent to prosolvent ratio of from about 10:1 to 1:1 to produce a casting solution;
   (b) generating a thin layer of the polyimide copolymer/dual solvent solution mixture;
   (c) partially evaporating the solvent from the polyimide polymer-solvent thin layer for from 2 to 120 seconds;
   (d) immersing the evaporated polymer-solvent thin layer in a gelation bath to form the asymmetric membrane.

2. The asymmetric polyimide reverse osmosis membrane of claim 1 wherein the undegraded co-polymer is dissolved in the dual solvent system, at a concentration of from 16-25 wt.%.

3. The asymmetric polyimide reverse osmosis membrane of claim 2 wherein the undegraded copolymer is dissolved in the dual solvent system at a concentration of from 18-22 wt.%.

4. The asymmetric polyimide reverse osmosis membrane of claim 1 wherein the dual solvent system is employed at an anti-solvent to pro-solvent ratio of from 7:1 to 1.5:1.

5. The asymmetric polyimide reverse osmosis membrane of claim 4 wherein the dual solvent system is employed at an anti-solvent to pro-solvent ratio of from 7:1 to 3:1.

6. The asymmetric polyimide reverse osmosis membrane of claim 1, 2, 3, 4 or 5 wherein the polyimide polymer-solvent thin layer is evaporated for from 2 to 60 seconds.

7. The asymmetric polyimide reverse osmosis membrane of claim 6 wherein the polyimide polymer-solvent thin layer is evaporated for from 2 to 30 seconds.

8. The asymmetric polyimide reverse osmosis membrane of claim 7 wherein the undegraded polyimide copolymer employed comprises from 10 to 90% of and from 90 to 10% of

9. The asymmetric polyimide reverse osmosis membrane of claim 8 wherein the undegraded polyimide copolymer employed comprises about 20% of and about 80% of produced by precipitation in a non aqueous crystallization solvent from which it is recovered by means of a non aqueous anti solvent prior to preparation of the casting solution.

10. A method for separating mixtures of organic solutions by reverse osmosis by contacting the organic solution to be separated with the dense side of an asymmetric membrane at a pressure sufficient to overcome the osmotic pressure wherein the asymmetric membrane is a high flux, high selectivity reverse osmosis polyimide membrane prepared by the process comprising:
   (a) dissolving from 14-30 wt.% of an undegraded polyimide copolymer derived from the cocondensation of benzophenone 3,3',4,4'-tetracarboxylic acid dianhydride (BTDA) and a mixture of di(4 amino-phenyl)methane and toluene diamine, or 4,4' methylene/bis(-phenyl isocyanate) and toluene diisocyanate in a dual solvent system comprising dioxane anti-solvent and N,N-dimethyl formamide (DMF) prosolvent at an anti-solvent to prosolvent ratio of from about 10:1 to 1:1 to produce a casting solution;
   (b) generating a thin layer of the polyimide co polymer dual solvent solution mixture;

(c) partially evaporating the solvent from the polyimide co-polymer/solvent thin layer for from 2 to 120 seconds;

(d) immersing the evaporated copolymer-solvent thin layer in a gelation bath to form the asymmetric reverse osmosis membrane.

11. The method of claim 10 wherein the pressure is a net driving force of about 100 to 1500 psi over the osmotic pressure and the temperature is about $-50°$ to $+150°$ C.

12. The method of claim 11 wherein the organic solutions to be separate comprise dewaxed oil and dewaxing solvent wherein the dewaxing solvent constitutes the permeate and the dewaxed oil constitutes the retentate.

13. The method of claim 12 wherein the dewaxing solvent is a ketone having from 3-6 carbons and mixtures thereof, $C_6$-$C_9$ aromatic hydrocarbons, mixtures of $C_3$-$C_6$ ketones and $C_6$-$C_9$ aromatic hydrocarbons, halogenated $C_1$-$C_4$ hydrocarbons, ethers and mixtures of ethers and ketones.

14. The method of claim 13 wherein the asymmetric reverse osmosis polyimide membrane is used in the form of a spiral wound element.

* * * * *